(12) United States Patent
Gjoerup

(10) Patent No.: US 7,861,048 B2
(45) Date of Patent: Dec. 28, 2010

(54) METHOD AND ARRANGEMENT FOR PROCESSING A FILE

(75) Inventor: Karsten Gjoerup, Aalborg (DK)

(73) Assignee: Infineon Technologies AG, Neubiberg (DE)

( * ) Notice: Subject to any disclaimer, the term of this patent is extended or adjusted under 35 U.S.C. 154(b) by 495 days.

(21) Appl. No.: 11/939,695

(22) Filed: Nov. 14, 2007

(65) Prior Publication Data

US 2009/0125696 A1 May 14, 2009

(51) Int. Cl.
*G06F 12/00* (2006.01)
(52) U.S. Cl. .................. 711/162; 711/156; 711/161; 711/170; 711/E12.103
(58) Field of Classification Search .................. None
See application file for complete search history.

(56) References Cited

U.S. PATENT DOCUMENTS 6,742,079 B1  5/2004  Kuschak
7,017,004 B1 *  3/2006  Calligaro et al. ............ 711/102
2004/0255181 A1  12/2004  Hsu et al.

FOREIGN PATENT DOCUMENTS

EP    1 469 388 A2    10/2004

OTHER PUBLICATIONS

"Microsoft Extensible Firmware Initiative FAT32 File System Specification"; Version 1.03, Dec. 6, 2000, Microsoft Corporation.

* cited by examiner

*Primary Examiner*—Shawn X Gu
(74) *Attorney, Agent, or Firm*—Dickstein Shapiro LLP

(57) ABSTRACT

A method for processing a file, a storage medium, and a processing arrangement. The method includes processing a file, the file being stored in a plurality of memory clusters of a storage medium, a portion of the file being modified and stored in a modification memory cluster, and the modified initial clusters being replaced by the respective modification memory clusters.

20 Claims, 5 Drawing Sheets

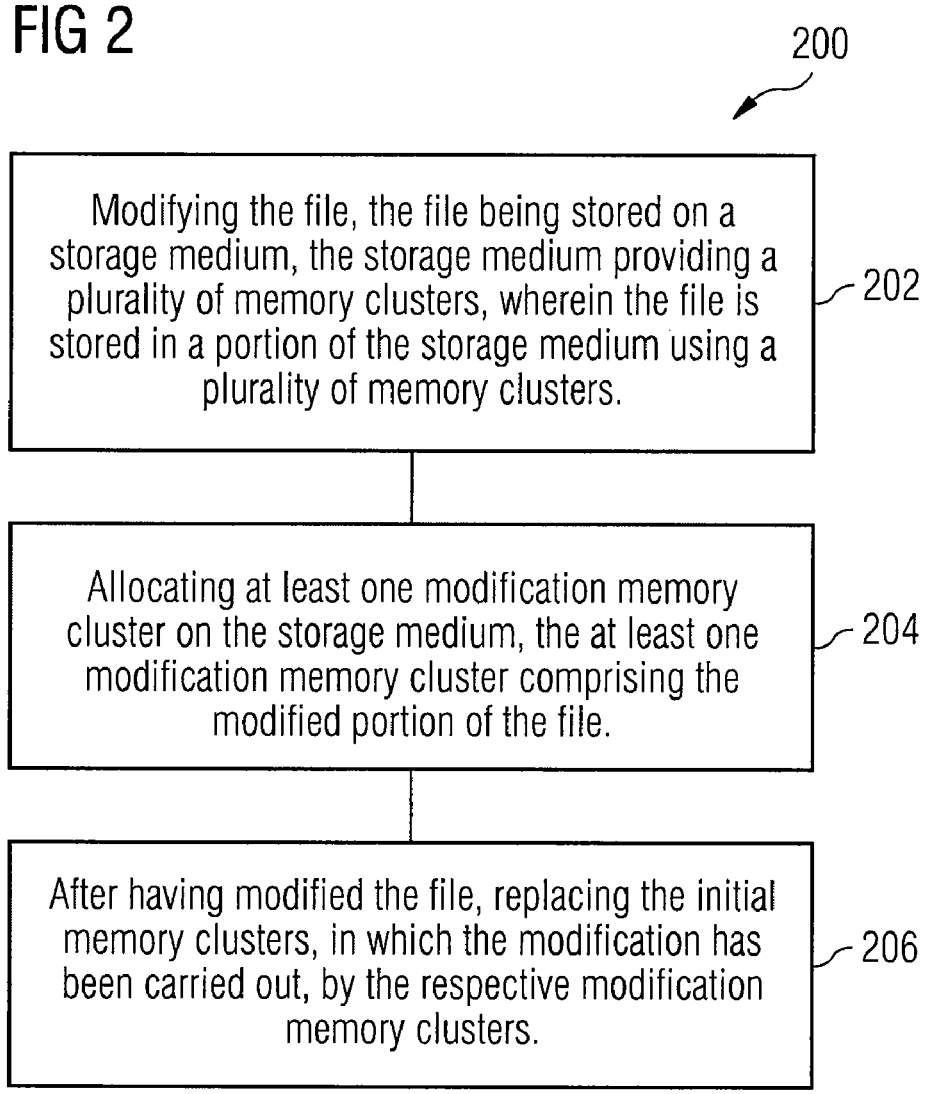

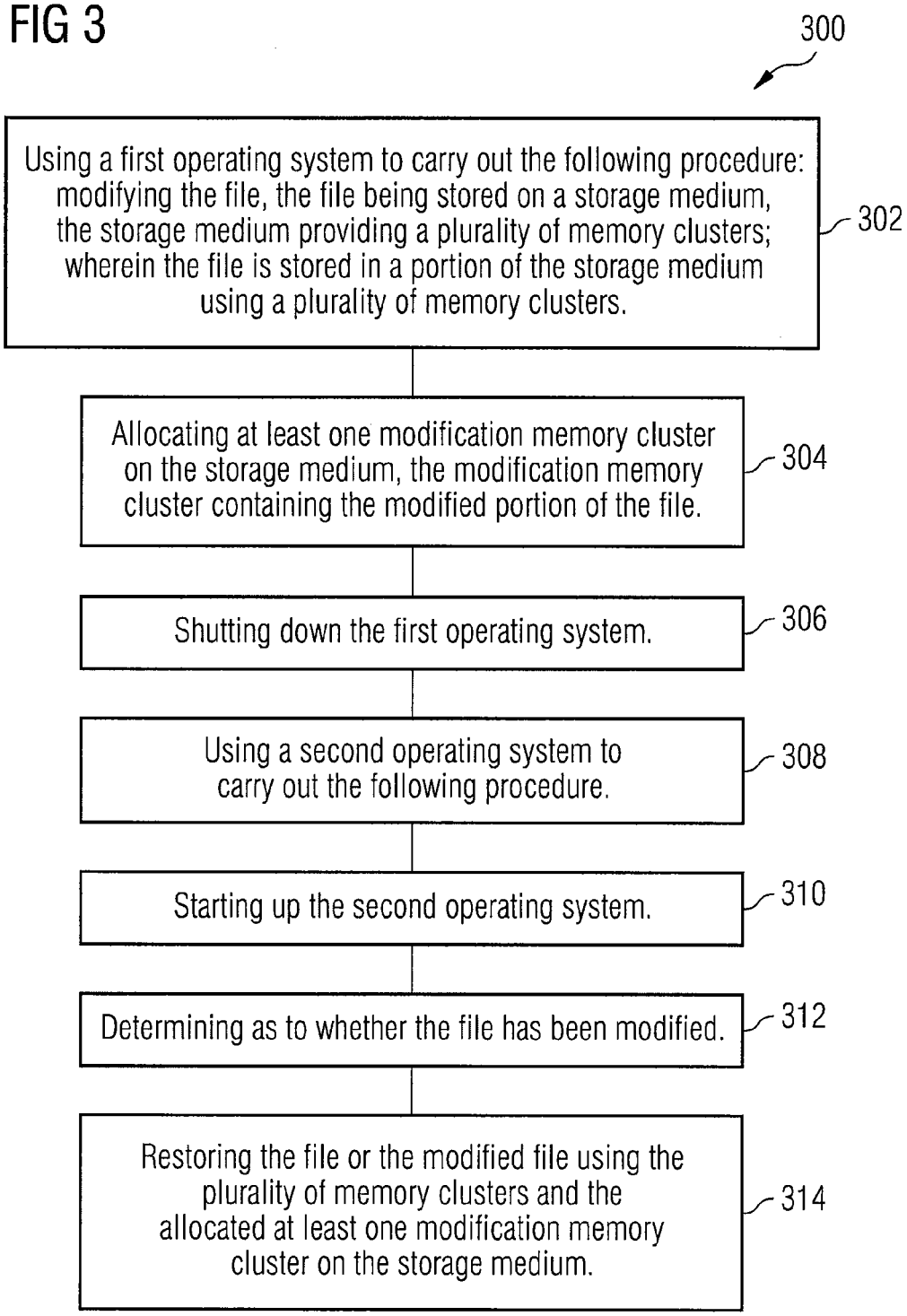

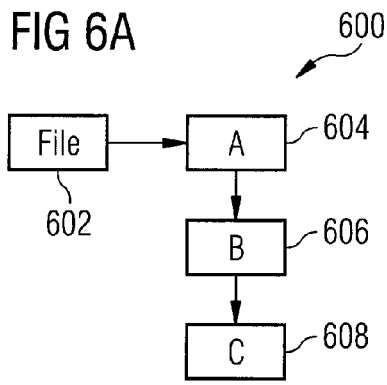
FIG 6A
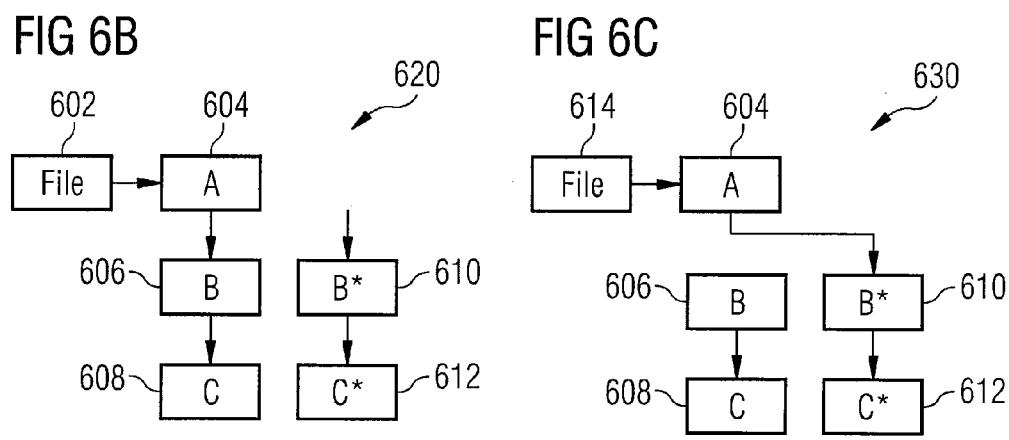
FIG 6B
FIG 6C
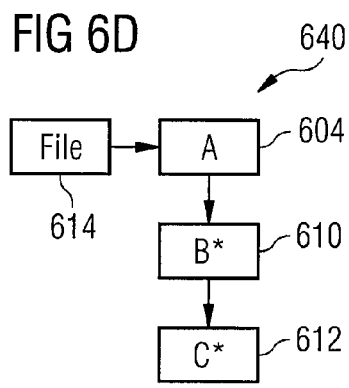
FIG 6D

METHOD AND ARRANGEMENT FOR PROCESSING A FILE

TECHNICAL FIELD

Embodiments of the invention relate generally to a method for processing a file, to a storage medium and to a processing arrangement.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a method for processing a file according to an embodiment of the invention;

FIG. 3 shows another method for processing a file according to an embodiment of the invention;

FIGS. 6A, 6B, 6C and 6D show the phases of a file on a storage medium being modified and stored or restored, respectively, according to embodiments of the invention.

SUMMARY

A storage medium, processing arrangement and method for processing a file. The file is modified and is stored on a storage medium, the storage medium providing a plurality of memory clusters. The file is stored in a portion of the storage medium using an initial memory cluster. At least one modification memory cluster is allocated on the storage medium, the modification memory cluster including a modified portion of the file. After having modified the file, replacing the initial memory cluster, in which the modification has been carried out, by the modification memory cluster.

DESCRIPTION

Embodiments of the invention implement power loss proofness in a File Allocation Table (FAT) file system and still make it compatible with other versions of FAT file systems.

Power loss occurs e.g. when a memory card is taken out from a mobile phone during a background file system operation that the user is not aware of or if the power supply for the processing device or the storage device is lost unexpectedly.

Conventionally, power loss proofness has been implemented using hidden directories and files on a disk or by using memory area outside the disk to store the operation state. This solution results in that the user potentially can end up with a file, which contains partly old data and partly new data.

Various embodiments of the invention provide power loss proofness without having hidden files and without using memory outside logical disk.

A file system operation is performed by making a number of disk operations in such a scheme, that the disk during the file system operation contains known FAT file system errors that can be corrected by most check disk code in such a way that no data will be lost.

In an embodiment of the invention, by the term "check disk" an executable computer program may be understood that may check, detect, and correct errors in conjunction with files stored on a physical medium, as e.g. a disk, or in conjunction with the storage of the files, their administration, or their storage media. The term "check disk" is based on the Windows® checkdisk program and stands in the following for any program with said or similar functionalities or characteristics. As "check disk" is a program for correcting file errors, as e.g. an incompletely modified file, also the term "error correction program" is used in the following in respect to the file errors to be corrected.

The files to be processed by a check disk program may be fragmented into several portions, each of which is allocated, partly sequentially, on an allocable memory unit, as e.g. a so-called cluster. A file allocation table (FAT) administrates the files and the portions or clusters of each file, so that a processor may access all portions of the file in the right order. For that, the FAT administrates a table e.g. to construct a linked list for a file and allocates address entries of the clusters. Thus, it is possible to specify a link of clusters and bad clusters using a FAT table.

Figure 1A:
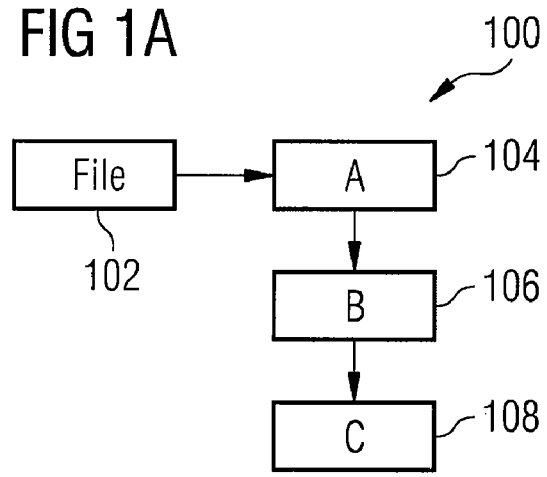
FIGS. 1A, 1B and 1C show a file in its original state; in an intermediate modified state and in a finally modified state, respectively.
Figure 1B:
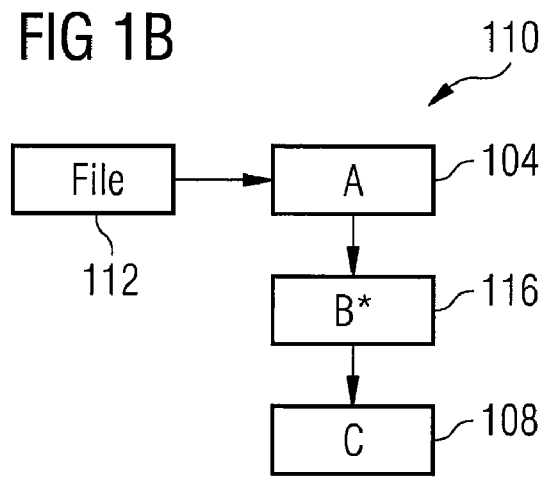
Figure 1C:
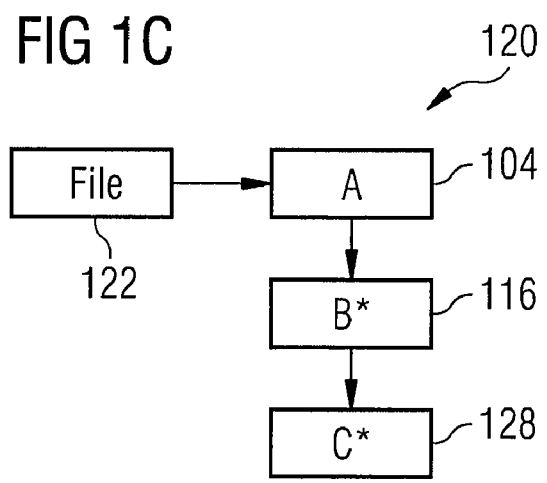

FIGS. 1A, 1B and 1C describe a conventional modification scheme (non-power loss proof) applied on a file if a user changes e.g. 200 bytes, which is located across a cluster boundary.

FIG. 1A shows in a first diagram 100 the original file 102 having a first portion A 104, a second portion B 106, and a third portion C 108. FIG. 1B shows in a second diagram 110 a half-modified file having the first portion A 104, a modified second portion B* 116, and the third portion C 108. FIG. 1C shows in a third diagram 120 the new file 122 having the first portion A 104, the modified second portion B* 116, and a modified third portion C* 128. Each portion may occupy one or several memory clusters of the memory of the storage device.

If the power is lost between the states represented by the second diagram 110 and the third diagram 120, the file system will contain a half old and half new file after start-up.

In a power loss proof solution, this is normally handled by saving the required operation and data somewhere else. After start-up the file system is able to complete the prior operation to be carried out to get from the state represented by the second diagram 110 to the state represented by the third diagram 120, and the overall result is that a file system will contain either the state according to the first diagram 100 or the state according to the third diagram 120 after a power loss. The problem comes in when another file system is operating the disk after start-up (like on external memory cards). In this case file version 112 according to the second diagram 110 will be taken as a valid file.

This scenario may be solved by a file/directory modification scheme that ensures compatibility with other file systems and that at the same time ensures no data loss. The effect of this disk operation scheme is that a power loss error made by e.g. a mobile phone on a memory card can be corrected, e.g., by a PC (Personal Computer) by applying standard software, as e.g. check disk for the Windows® operating system.

FIG. 2 shows a method 200 for processing a file according to an embodiment of the invention.

In 202, the file being stored on a storage medium is modified, wherein the storage medium provides a plurality of memory clusters, and wherein the file is stored in a portion of the storage medium using a plurality of memory clusters.

In 204 at least one modification memory cluster is allocated on the storage medium, wherein the at least one modification memory cluster contains the modified portion of the file.

In 206 the initial memory clusters in which the modification has been carried out are replaced by the respective modification memory clusters after the file has been modified.

Figure 4:
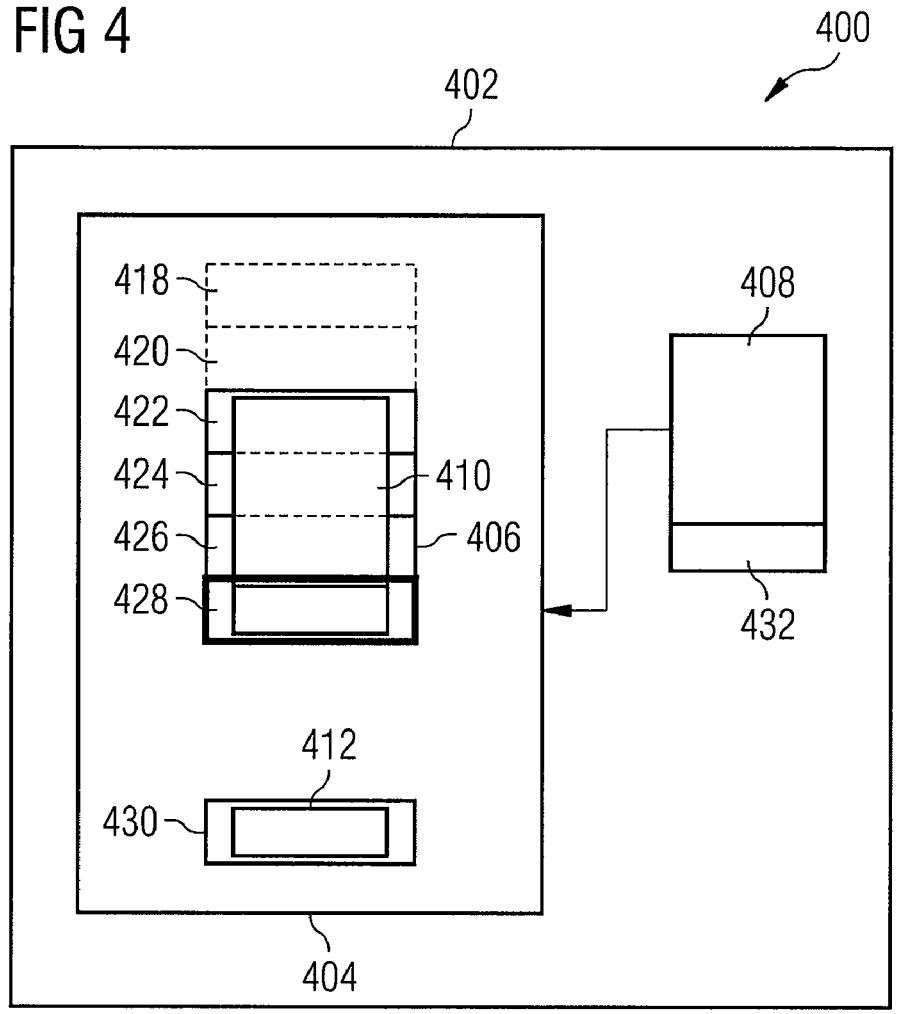
FIG. 4 shows a storage medium according to an embodiment of the invention.

In other words, the file 410 as e.g. shown in FIG. 4 is stored in the memory area 404 of the storage medium 402 which contains of a plurality of clusters 418, 420, 422, 424, 426, 428, 430. The file 410 occupies e.g. several clusters 422, 424, 426, 428 of this plurality of clusters 418, 420, 422, 424, 426, 428, 430. The cluster 430 is e.g. a modification memory cluster that contains the modifications of the initial memory cluster 428 of the file 410. When the writing of the modifications is completed, i.e. the data 412 representing the modifications with respect to the initial cluster 428 are written into the modification memory cluster 430, the initial cluster 428 is replaced by the modification memory cluster 430.

The clusters may be organized by a File Allocation Table (FAT). FATs may be used to keep track of the allocation status of memory clusters, or logical groupings of memory sectors, on the disk drive. In order that a FAT is able to manage files efficiently, it groups memory sectors into larger blocks referred to as memory clusters. In an embodiment of the invention, a memory cluster may be understood as the smallest unit of disk space that can be allocated to a file. Each memory cluster can be used by exactly one resident file. Only the "data area" is divided into memory clusters, the rest of the partition is simply memory sectors. The memory sectors in a memory cluster are continuous, therefore each memory cluster may be a continuous block of space on the disk.

According to an embodiment of the invention, each memory cluster 418, 420, 422, 424, 426, 428 and the at least one modification memory cluster 430 may contain a plurality of memory sectors.

According to an embodiment, after replacing the initial memory clusters 428 to be modified the initial memory clusters 428 may be deleted. In this way, it is ensured that the replaced memory clusters 412 are the only valid memory clusters and the memory space is released.

According to an embodiment of the invention, the storage medium is a non-volatile storage medium.

According to an embodiment, the non-volatile storage medium contains at least one of the following types of storage media: a hard disk drive; a Flash storage medium; or a resistivity changing memory storage medium. Further it may include read-only memory as e.g. Erasable Programmable Read-Only Memories (EPROMs), Electrically Erasable Programmable Read-Only Memories (EEPROMs), types of magnetic computer storage devices, as e.g., floppy disk drives, and magnetic tapes or optical disk drives.

According to an embodiment, the non-volatile Flash storage medium contains a charge storing Random Access Memory storage medium (e.g. charge trapping Random Access Memory storage medium or floating gate storage medium). In an embodiment of the invention, the non-volatile Flash storage medium may include Flash memory cells in any suitable architecture such as e.g. in a NAND architecture or in a NOR architecture. The non-volatile Flash storage medium may be mounted internally in a electrical device.

According to an embodiment, the resistivity changing memory storage medium contains at least one of the following types of storage media: a Magnetoresistive Random Access Memory storage medium; a conductive filament (e.g. Conductive bridging Random Access Memory (CBRAM) storage medium or carbon filament-based Random Access Memory storage medium); a phase change Random Access Memory (PCRAM) storage medium; or an organic Random Access Memory (ORAM) storage medium.

A FAT may include e.g. the following entries: "allocated" (along with the address of the next cluster associated with the file), "unallocated", "end of file", and "bad sector". The FAT may, however, provide more information about the state of a file.

According to an embodiment of the invention, the method further includes: storing an indication information that the file 410 has been modified and no regular shut-down of the storage medium 402 has been carried out; when starting-up the storage medium 402, checking, whether the indication information is stored; and in case that the indication information is stored, carrying out an error correction program to either restore the initial file or the modified file.

According to an embodiment, the error correction program is an error correction program of one of the following types: a DOS operating system based error correction program; or a Windows® operating system (e.g. Windows® NT, Windows® 2000, Windows® XP, Windows® Vista, Windows® CE, Windows® Mobile, Pocket PC) based error correction program; or a UNIX® operating based error correction program; or a Linux operating based error correction program.

Of course, in principle, the error correction program may be a program of any operating system. In the following some examples of error correction programs for operating systems are presented.

According to an embodiment of the invention, the Windows® operating system based error correction program is a checkdisk error correction program or a scandisk error correction program.

According to an embodiment, the UNIX® operating system based error correction program or the Linux operating system based error correction program is an fsck error correction program.

According to an embodiment of the invention, the replacing of the initial memory clusters 428 includes amending a file allocation table. Some characteristics of a file allocation table were shown above. The amending of a file allocation table may be in form of an additional information of a part of the information usually stored in the FAT. Furthermore, the indication information that the file has been modified and no regular shut-down of the storage medium has been carried out may be stored in the file allocation table.

According to an embodiment of the invention, a method 300 for processing a file 410 is provided.

As shown in FIG. 3, the method 300 according to this embodiment includes in 302 using a first operating system to carry out the following procedure: modifying the file 410, the file 410 being stored on a storage medium 402, the storage medium 402 providing a plurality of memory clusters 418, 420, 422, 424, 426, 428, 430; wherein the file 410 is stored in a portion of the storage medium 402 using a plurality of memory clusters 422, 424, 426, 428; in 304 allocating at least one modification memory cluster 430 on the storage medium 402, the modification memory cluster 430 containing the modified portion 412 of the file 410; in 306 shutting down the first operating system; in 308 using a second operating system to carry out the following procedure: in 310 starting up the second operating system; in 312 determining as to whether the file 410 has been modified; and in 314 restoring the file 410 or the modified file using the plurality of memory clusters 422, 424, 426, 428 and the allocated at least one modification memory cluster 430 on the storage medium 402.

This means in a main aspect that the file 410 may be modified by a first operating system on a first processing device, and may thereafter be accessed by a second operating system. The storage medium 402 may be accessed using an operating system running on the first or on a second processing device. The same applies to the file 410 on the storage medium 402. The storage medium may be connected directly or indirectly to the first processing device or to a second processing device, or it may be inserted into a processing device. This includes also any kind of remote access.

The shutting down of the operating system may be incomplete or even abrupt, caused e.g. by a sudden loss of the power supply or a crash.

Especially in these cases the user-intended modification and storing of the file may not be completed successfully.

Furthermore, shutting down the operating system may be interpreted as withdrawing the control of the operating system over the file e.g. by disconnecting the memory storage from a system on which the first operating system is running unexpectedly.

In a similar way, the starting of the second operating system may be interpreted as giving the second operating system the control over the storage medium and thus over the file on the storage medium 402.

According to an embodiment of the invention, each memory cluster 418, 420, 422, 424, 426, 428 and the at least one modification memory cluster 430 of the method 300 may include a plurality of memory sectors. As explained further above, for the most operating systems memory clusters are the smallest addressable memory units in respect to file allocation on a storage medium. However, the memory clusters may be physically further subdivided into memory sectors.

According to an embodiment of the invention, the method further includes deleting the initial memory clusters 428 after replacing the initial memory clusters 428.

In this way the memory is "cleaned up". The memory clusters are marked as "deleted" and may be re-used by the operating system.

According to an embodiment of the invention, the storage medium is a non-volatile storage medium.

According to an embodiment, the non-volatile storage medium contains at least one of the following types of storage media: a hard disk drive; a Flash storage medium; or a resistivity changing memory storage medium. Further it may include read-only memory as e.g. Erasable Programmable Read-Only Memories (EPROMS), Electrical Erasable Programmable Read-Only Memories (EEPROMS), types of magnetic computer storage devices, as e.g., floppy disk drives, and magnetic tapes or optical disk drives.

According to an embodiment, the non-volatile Flash storage medium is a charge storing Random Access Memory storage medium (e.g. charge trapping Random Access Memory storage medium or floating gate storage medium).

According to an embodiment, the resistivity changing memory storage medium is at least one of the following types of storage media: a Magnetoresistive Random Access Memory storage medium; a conductive filament (e.g. Conductive bridging Random Access Memory (CBRAM) storage medium or carbon filament-based Random Access Memory storage medium); a phase change Random Access Memory (PCRAM) storage medium; or an organic Random Access Memory (ORAM) storage medium.

According to an embodiment of the invention, the method may further include storing an indication information on the storage medium 402 that the file 410 has been modified and no regular shut-down of the storage medium 402 has been carried out; when starting-up the second operating system, checking, whether the indication information is stored on the storage medium 402; and in case that the indication information is stored on the storage medium 402, carrying out an error correction program to either restore the initial file or the modified file.

As explained above, the starting up of the second operating system may be a regular starting up. A check disk program may be carried out may be carried out during or after the starting up.

Thus, according to an embodiment of the invention, the error correction program is carried out by the second operating system.

In another embodiment of the invention, the starting up of the second operating system may be interpreted as giving the second operating system the control over the storage medium 402 and therewith also of the file 410. This may be e.g. the case when inserting the memory storage 402, as e.g. a memory card into a memory slot of the processing device. The operating system may detect the insertion and start an error correction program, as e.g. a check disk program.

The error correction program may be started automatically, e.g. when starting the operating system or when inserting the storage medium 402 into the memory card slot.

However, according to an embodiment of the invention, the error correction program may also be started manually; either by starting the program directly or indirectly by starting a program which again calls the error correcting program.

According to a further embodiment of the invention, the error correction program is an error correction program of one of the following types: a DOS operating system based error correction program; or a Windows® operating system (e.g. Windows® NT, Windows® 2000, Windows® XP, Windows® Vista, Windows® CE, Windows® Mobile, Pocket PC) based error correction program; or a UNIX® operating based error correction program; or a Linux operating based error correction program.

According to an embodiment, the Windows® operating system based error correction program is a checkdisk error correction program or a scandisk error correction program.

According to an embodiment, the UNIX® operating system based error correction program or the Linux operating system based error correction program is an fsck error correction program.

According to an embodiment, the replacing the of the initial memory clusters 428 includes amending a file allocation table.

According to an embodiment of the invention, the method may further include connecting a storage medium 402 to a first processing device, the first processing device containing a first operating system; after shutting down the first operating system, connecting the storage medium to a second processing device, the second processing device containing the second operating system.

The shut-down of the first operating system may be abrupt, forced or incomplete as indicated above. In this way, the modified file might not be stored correctly as intended by the user; but is restored to either its correctly modified state or to its original state by the correcting program running under the second operating system.

According to an embodiment of the invention, the method may further include replacing the initial memory clusters 428 in which the modification has been carried out by the respective modification memory clusters 430 after having modified the file 410.

According to an embodiment, a storage medium 402 is provided as e.g. depicted in FIG. 4, containing a storage area 404 containing a plurality of memory clusters 418, 420, 422, 424, 426, 428, 430; and a storage medium controller 408 configured to modify a file 410, the file 410 being stored in a plurality of memory clusters 418, 420, 422, 424, 426, 428 of the storage area; when amending the file 410, allocate at least one modification memory cluster 430 in the storage area 404, the modification memory cluster 430 containing the modified portion 428 of the file 410; after having modified the file 410, replace the initial memory clusters 428, in which the modification has been carried out, by the respective modification memory clusters 430.

Physically, the storage medium controller 408 may be located on, i.e. integrated into the storage medium 402, as e.g. CompactFlash (CF)-, MultiMedia (MMC)-, SecureDigital-Card (SD)-cards, and Small Computer System Interface (SCSI) disks; or it may be located outside the storage medium 402, as e.g. SmartMedia (SM)-cards.

According to an embodiment, the storage medium 402 further contains a file allocation circuit 432 to allocate memory clusters to a file being stored in the storage area 404.

The file allocation circuit 432 may be a part or at least affiliated to the storage medium controller 408. The file allocation circuit 432 is also responsible for the entries of the FAT.

According to an embodiment, each memory cluster 418, 420, 422, 424, 426, 428 and the at least one modification memory cluster 430 contain a plurality of memory sectors.

According to an embodiment, the storage medium controller 408 is configured to delete the initial memory clusters 428 after replacing the initial memory clusters 428.

According to an embodiment, the storage medium 402 is a non-volatile storage medium.

According to an embodiment, the non-volatile storage medium is at least one of the following types of storage media: a hard disk drive; a Flash storage medium; a resistivity changing memory storage medium.

According to an embodiment, the non-volatile Flash storage medium contains a charge storing Random Access Memory storage medium (e.g. charge trapping Random Access Memory storage medium or floating gate storage medium).

According to an embodiment, the resistivity changing memory storage medium comprises at least one of the following types of storage media: a Magnetoresistive Random Access Memory storage medium; a conductive filament (e.g. Conductive bridging Random Access Memory (CBRAM) storage medium or carbon filament-based Random Access Memory storage medium); a phase change Random Access Memory (PCRAM) storage medium; or an organic Random Access Memory (ORAM) storage medium.

According to an embodiment, the storage medium 402 further contains a storage item to store an indication information that the file 410 has been modified and no regular shutdown of the storage medium has been carried out; according to this embodiment, the storage medium controller 408 is configured to when starting-up the storage medium 402, check, whether the indication information is stored; and in case that the indication information is stored, carry out an error correction program to either restore the initial file or the modified file.

According to an embodiment, the error correction program is an error correction program of one of the following types: a DOS operating system based error correction program; or a Windows® operating system (e.g. Windows® NT, Windows® 2000, Windows® XP, Windows® Vista, Windows® CE, Windows® Mobile, Pocket PC) based error correction program; or a UNIX® operating based error correction program; or a Linux operating based error correction program.

In principle, the error correction program may be a program of any operating system. In the following embodiments some examples of error correction programs for operating systems are given.

According to an embodiment, the Windows® operating system based error correction program is a checkdisk error correction program or a scandisk error correction program.

According to an embodiment, the UNIX® operating system based error correction program or the Linux operating system based error correction program is an fsck error correction program.

According to an embodiment, the storage medium controller 408 is configured to amend a file allocation table when replacing the initial memory clusters.

Figure 5:
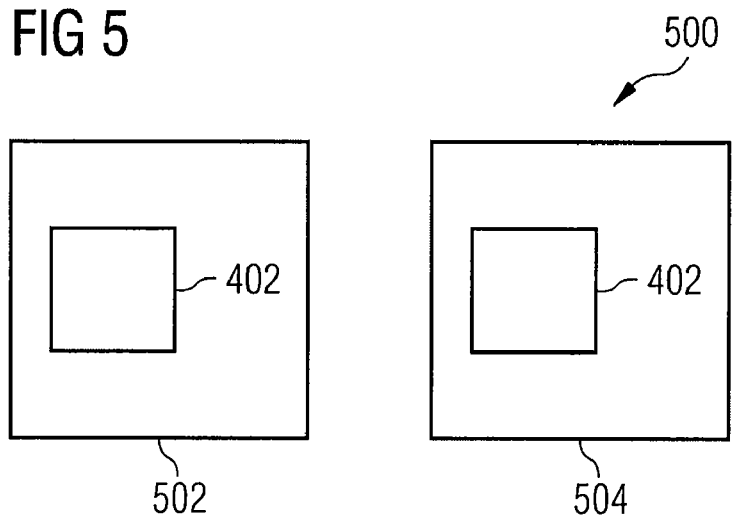
FIG. 5 shows a processing arrangement according to an embodiment of the invention.

According to an embodiment, as illustrated in FIG. 5, a processing arrangement 500 is provided, containing: a first processing device 502 including a first operating system, the first operating system being configured to request a modification of a file 410 being stored on a storage medium 402; the storage medium 402 providing a plurality of memory clusters 418, 420, 422, 424, 426, 428, 430, the storage medium 402 including a storage area 404 including a plurality of memory clusters 418, 420, 422, 424, 426, 428, 430; and a storage medium controller 408 configured to modify a file 410, the file 410 being stored in a plurality of memory clusters 422, 424, 426, 428 of the storage area 404; when amending the file 410, allocating at least one modification memory cluster 430 in the storage area 404, the modification memory cluster 430 containing the modified portion 412 of the file 410; after having modified the file 410, replacing the initial memory clusters 428, in which the modification has been carried out, by the respective modification memory clusters 430.

According to an embodiment of the invention, the processing arrangement 500 may further include a second processing device 504 having a second operating system installed therein, the second operating system being configured to request access to the file 410 being stored on the storage medium 402; wherein the storage medium controller 408 is configured to determine as to whether the file 410 has been modified; restore the file 410 or the modified file using the plurality of memory clusters 418, 420, 422, 424, 426, 428 and the allocated at least one modification memory cluster 430 on the storage medium 402.

According to an embodiment, each memory cluster 418, 420, 422, 424, 426, 428 and the at least one modification memory cluster 430 of the storage medium 402 in the processing arrangement 500 contain a plurality of memory sectors.

According to an embodiment, the storage medium 402 in the processing arrangement 500 further contains a file allocation circuit 432 to allocate memory clusters 418, 420, 422, 424, 426, 428, 430 to a file being stored in the storage area 404.

According to an embodiment, the storage medium 402 in the processing arrangement 500 is a non-volatile storage medium.

According to an embodiment, the non-volatile storage medium 402 in the processing arrangement 500 contains at least one of the following types of storage media: a hard disk drive; a Flash storage medium; a resistivity changing memory storage medium.

According to an embodiment, the non-volatile Flash storage medium in the processing arrangement 500 contains a charge storing Random Access Memory storage medium (e.g. charge trapping Random Access Memory storage medium or floating gate storage medium).

According to an embodiment, the resistivity changing memory storage medium contains at least one of the following types of storage media: a Magnetoresistive Random Access Memory storage medium; a conductive filament (e.g. Conductive bridging Random Access Memory (CBRAM) storage medium or carbon filament-based Random Access Memory storage medium); a phase change Random Access Memory (PCRAM) storage medium; or an organic Random Access Memory (ORAM) storage medium.

According to an embodiment of the invention, the storage medium 402 in the processing arrangement 500 may further include a storage item to store an indication information that the file 410 has been modified and no regular shut-down of the storage medium has been carried out. According to this embodiment the storage medium controller 408 is configured to, when starting-up the storage medium, check, whether the indication information is stored; and in case that the indication information is stored, carry out an error correction program to either restore the initial file or the modified file. By way of example, the storage item may be a flag or another stored data item representing the respective information.

The error correction program is particularly carried out under the operating system of the second processing device 504.

According to an embodiment, the error correction program is an error correction program of one of the following types: a DOS operating system based error correction program; or a Windows® operating system (e.g. Windows® NT, Windows® 2000, Windows® XP, Windows® Vista) based error correction program; or a UNIX® operating based error correction program; or a Linux operating based error correction program.

According to an embodiment, the Windows® operating system based error correction program is a checkdisk error correction program or a scandisk error correction program.

According to an embodiment, the UNIX® operating system based error correction program or the Linux operating system based error correction program is an fsck error correction program.

According to an embodiment, the storage medium controller 408 in the processing arrangement 500 is configured to amend a file allocation table when replacing the initial memory clusters 428.

According to an embodiment, the first processing device is a communication device. Such a communication device may, e.g., be a radio communication device or a mobile radio communication device according to e.g. the $2^{nd}$, $3^{rd}$ or $4^{th}$ generation standards and their derivations, i.e., e.g. GSM (Global System for Mobile Communications), UMTS (Universal Mobile Telecommunications System), IMT-2000, CDMA2000, Long Term Evolution Universal Mobile Telecommunications System or a cordless radio communication device, as e.g. according to the DECT (Digital Enhanced Cordless Telecommunications)-standard or the Bluetooth standard or a computer device, as e.g. a personal computer, workstation, laptop, notebook, Personal Digital Assistant (PDA), Smart Phone etc., or any other communication device providing processing capabilities and being able to run an operating system.

According to an embodiment, the second processing the second processing device. Such a communication device may, e.g., be a radio communication device or a mobile radio communication device according to e.g. the $2^{nd}$, $3^{rd}$ or $4^{th}$ generation standards and their derivations, i.e., e.g. GSM (Global System for Mobile Communications), UMTS (Universal Mobile Telecommunications System), IMT-2000, CDMA2000, Long Term Evolution Universal Mobile Telecommunications System or a cordless radio communication device, as e.g. according to the DECT (Digital Enhanced Cordless Telecommunications)-standard or the Bluetooth standard or a computer device, as e.g. a personal computer, workstation, laptop, notebook, Personal Digital Assistant (PDA), Smart Phone etc., or any other communication device providing processing capabilities and being able to run an operating system.

According to an embodiment of the invention, a storage medium 402, is provided containing: a storage area 404 comprising a plurality of memory clusters 418 . . . 430; and a storage medium controlling means 408 for modifying a file 410, the file 410 being stored in a plurality of memory clusters 422, 424, 426, 428 of the storage area 404; when amending the file 410, allocating at least one modification memory cluster 430 in the storage area 404, the modification memory cluster 430 containing the modified portion 412 of the file; after having modified the file 410, replacing the initial memory clusters 428, in which the modification has been carried out, by the respective modification memory clusters 430.

FIGS. 6A to 6D show an example according to an embodiment of the invention. 600, 620, 630 and 640 describe the various states of the old file 602 or the new file 614 before (600), during (620, 630) and after (640) the modification process, respectively.

FIG. 6A shows in 600 the original file 602 to be modified, including a first portion A 604, a second portion B 606, and a third portion C 608. The portions 604, 606, 608 may occupy one or several memory clusters each, as e.g. shown in FIG. 4.

FIG. 6B shows in 620 the original file 602 including the portions A 604, B 606, and C 608 and a lost memory portion chain (including a modified second portion B* 610 and a modified third portion C* 612). Furthermore, the portions 610, 612 may occupy one or several memory clusters each. The modified second portion B* 610 and the modified third portion C* 612 may contain a modified part of the file 602 stored in modification memory clusters 430 on the storage medium 402. The modification memory clusters related to these portions B* 610 and C* 612 containing the modified portion of the file 602 are not yet linked to the file 410.

FIG. 6C shows in 630 the new file 614 with the first portion A 604, the modified second portion B* 610, and the modified third portion C* 612, and a lost memory portion chain (including the second portion B 606 and the third portion C 608. The modification memory clusters related to these portions are linked to the file 410 now. By linking the modification memory clusters to the file in the file allocation table, the original clusters are replaced.

If power is lost right after 620 or 630 any check disk operation is able to remove the lost memory portion chain including the modified second portion B* 610, the modified third portion C* 612 in 620 or the second portion B 606, the third portion C 608 in 630, respectively. The overall result is that the user will never end up with a half old—half new file, even when changing the file system like on memory cards or using USB mass storage. Instead, either the original file as in state 600 is restored or the modified file as in state 640 is restored. FIG. 6D shows in 640 the new file 614 (including the first portion A 604, the modified second portion B* 610, and the modified third portion C* 612).

Similar schemes can be used, e.g. when moving directories, moving files, deleting files, creating files or extending files.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing a file, the method comprising:
modifying the file, the file being stored on a storage medium having a plurality of memory clusters, thereby generating a modified portion of the file;
wherein the file is stored in a portion of the storage medium using at least one initial memory cluster;
allocating at least one modification memory cluster on the storage medium, the modification memory cluster comprising the modified portion of the file;
after having modified the file, replacing the at least one initial memory cluster, in which the modification has been carried out, by the respective at least one allocated modification memory cluster;
storing an indication information that the file has been modified and no regular shut-down of the storage medium has been carried out;
when starting-up the storage medium, checking, whether the indication information is stored; and
in case that the indication information is stored, carrying out an error correction program to either restore the file or the modified portion of the file using the at least one initial memory cluster or the at least one modification memory cluster, respectively.

2. The method of claim 1,
wherein each at least one initial memory cluster and the at least one modification memory cluster comprises a plurality of memory sectors.

3. The method of claim 1, further comprising:
after replacing the at least one initial memory cluster, deleting the replaced initial memory cluster.

4. The method of claim 1,
wherein the storage medium is a non-volatile storage medium.

5. The method of claim 1,
wherein the error correction program is a checkdisk error correction program or a scandisk error correction program.

6. The method of claim 1,
wherein the error correction program is an fsck error correction program.

7. The method of claim 1,
wherein the replacing of the at least one initial memory cluster comprises amending a file allocation table.

8. A method for processing a file, the method comprising:
using a first operating system to carry out the following procedure:
modifying the file, the file being stored on a storage medium, having a plurality of memory clusters, thereby generating a modified portion of the file;
wherein the file is stored in a portion of the storage medium using at least one initial memory cluster;
allocating at least one modification memory cluster on the storage medium, the at least one modification memory cluster comprising the modified portion of the file; and
shutting down the first operating system; and
using a second operating system to carry out the following procedure:
starting up the second operating system;
determining as to whether the file has been modified; and
restoring the file or the modified portion of the file using the at least one initial memory cluster or the allocated at least one modification memory cluster, respectively, on the storage medium.

9. The method of claim 8,
wherein the storage medium is a non-volatile storage medium.

10. The method of claim 8 further comprising:
storing an indication information on the storage medium that the file has been modified and no regular shut-down of the storage medium has been carried out;
when starting-up the second operating system, checking, whether the indication information is stored on the storage medium; and
in case that the indication information is stored on the storage medium, carrying out an error correction program to either restore the file or the modified portion of the file.

11. The method of claim 8 further comprising:
connecting the storage medium to a first processing device, the first processing device comprising a first operating system; and
after shutting down the first operating system, connecting the storage medium to a second processing device, the second processing device comprising the second operating system.

12. The method of claim 8 further comprising:
after having modified the file, replacing the at least one initial memory cluster, in which the modification has been carried out, by the respective at least one modification memory cluster.

13. A storage medium, comprising:
a storage area comprising a plurality of memory clusters; and
a storage medium controller configured to:
modify a file which is stored in at least one initial memory cluster of the storage area, thereby generating a modified portion of the file;
when amending the file, allocate at least one modification memory cluster in the storage area, the at least one modification memory cluster comprising the modified portion of the file; and
after having modified the file, replace the at least one initial memory cluster, in which the modification has been carried out, by the respective at least one allocated modification memory cluster; and
a storage item configured to store an indication information that the file has been modified and no regular shut-down of the storage medium has been carried out;
wherein the storage medium controller is configured to:
when starting-up the storage medium, check, whether the indication information is stored; and
in case that the indication information is stored, carry out an error correction program to either restore the file or the modified portion of the file using the at least one initial memory cluster or the at least one modification memory cluster, respectively.

14. The storage medium of claim 13 further comprising:
a file allocation circuit configured to allocate memory clusters to a file being stored in the storage area, thereby generating a File Allocation Table.

15. The storage medium of claim 13,
wherein the storage medium is a non-volatile storage medium.

16. The storage medium of claim 13,
wherein the error correction program is a checkdisk error correction program or a scandisk error correction program.

17. A processing arrangement, comprising:
a first processing device comprising a first operating system, the first operating system being configured to request a modification of a file being stored on a storage medium;
the storage medium comprising:
   a storage area comprising a plurality of memory clusters; and
   a storage medium controller configured to:
      modify the file, the file being stored in at least one initial memory cluster of the storage area, thereby generating a modified portion of the file;
      when amending the file, allocating at least one modification memory cluster in the storage area, the at least one modification memory cluster comprising the modified portion of the file;
      after having modified the file, replacing the at least one initial memory cluster, in which the modification has been carried out, by the respective at least one allocated modification memory cluster; and
   a storage item configured to store an indication information that the file has been modified and no regular shut-down of the storage medium has been carried out;
   wherein the storage medium controller is configured to:
      when starting-up the storage medium, check, whether the indication information is stored; and
      in case that the indication information is stored, carry out an error correction program to either restore the file or the modified portion of the file using the at least one initial memory cluster or the at least one modification memory cluster, respectively.

18. The processing arrangement of claim 17 further comprising:
a second processing device comprising a second operating system, the second operating system being configured to request access to the file being stored on the storage medium;
wherein the storage medium controller is configured to:
   determine whether the file has been modified; and
   restore the file or the modified portion of the file using the at least one initial memory cluster or the allocated at least one modification memory cluster, respectively, on the storage medium.

19. The processing arrangement of claim 18,
wherein the first processing device is a communication device, and the second processing device is a communication device.

20. A storage medium, comprising:
a storage area comprising a plurality of memory clusters; and
a storage medium controlling means for:
   modifying a file, the file being stored in at least one initial memory cluster of the storage area, thereby generating a modified portion of the file;
   when amending the file, allocating at least one modification memory cluster in the storage area, the at least one modification memory cluster comprising the modified portion of the file; and
   after having modified the file, replacing the at least one initial memory cluster, in which the modification has been carried out, by the respective at least one allocated modification memory cluster; and
a storage item configured means for storing an indication information that the file has been modified and no regular shut-down of the storage medium has been carried out
wherein the storage medium controlling means is further for:
   when starting-up the storage medium, checking, whether the indication information is stored; and
   in case that the indication information is stored, carrying out an error correction program to either restore the file or the modified portion of the file using the at least one initial memory cluster or the at least one modification memory cluster, respectively.

* * * * *